United States Patent [19]

Briles

[11] Patent Number: 4,765,787
[45] Date of Patent: Aug. 23, 1988

[54] BLIND FASTENER POSITIVELY LOCKING TO WORK, AND EMPLOYING INTERIOR LOCKING RING

[76] Inventor: Franklin S. Briles, 230 Burma Rd., Fallbrook, Calif. 92028

[21] Appl. No.: 45,289

[22] Filed: May 4, 1987

Related U.S. Application Data

[63] Continuation-in-part of Ser. No. 26,147, Mar. 16, 1987.

[51] Int. Cl.⁴ ............................................. F16B 13/04
[52] U.S. Cl. ......................................... 411/41; 411/43
[58] Field of Search ...................... 411/40, 41, 43, 54, 411/55, 424; 403/408.1

[56] References Cited

U.S. PATENT DOCUMENTS

| | | | |
|---|---|---|---|
| 3,921,364 | 11/1975 | Briles | 411/424 |
| 4,012,984 | 3/1977 | Matuschek | 411/43 |
| 4,127,345 | 11/1978 | Angelosanto et al. | 403/408.1 |
| 4,170,920 | 10/1979 | Siegol | 411/43 |
| 4,370,081 | 1/1983 | Briles | 411/43 |
| 4,451,189 | 5/1984 | Pratt | 411/43 |
| 4,627,775 | 12/1986 | Dixon | 411/43 |

Primary Examiner—Neill R. Wilson
Attorney, Agent, or Firm—William W. Haefliger

[57] ABSTRACT

A tubular fastener has an axially extending tubular shank receivable in a work bore, and an annular head receivable in forcible engagement with the work material forming a counterbore, and the fastener is further characterized by:
 (a) the head having an annular end face, a first section located forwardly of the end face and having an outer annular surface to be urged in a radially outward direction to forcibly engage the work counterbore, and a second forwardly tapered section located forwardly of the first section,
 (b) a pin extending within the tubular shank, and a stem connected to the pin and extending endwise therefrom and from the tubular fastener,
 (c) structure responsive to displacement of the pin toward the head end of the fastener to expand the fastener shank at the opposite end of the fastener and axially retain the fastener in position with the head first section forcibly engaging the counterbore.

9 Claims, 2 Drawing Sheets

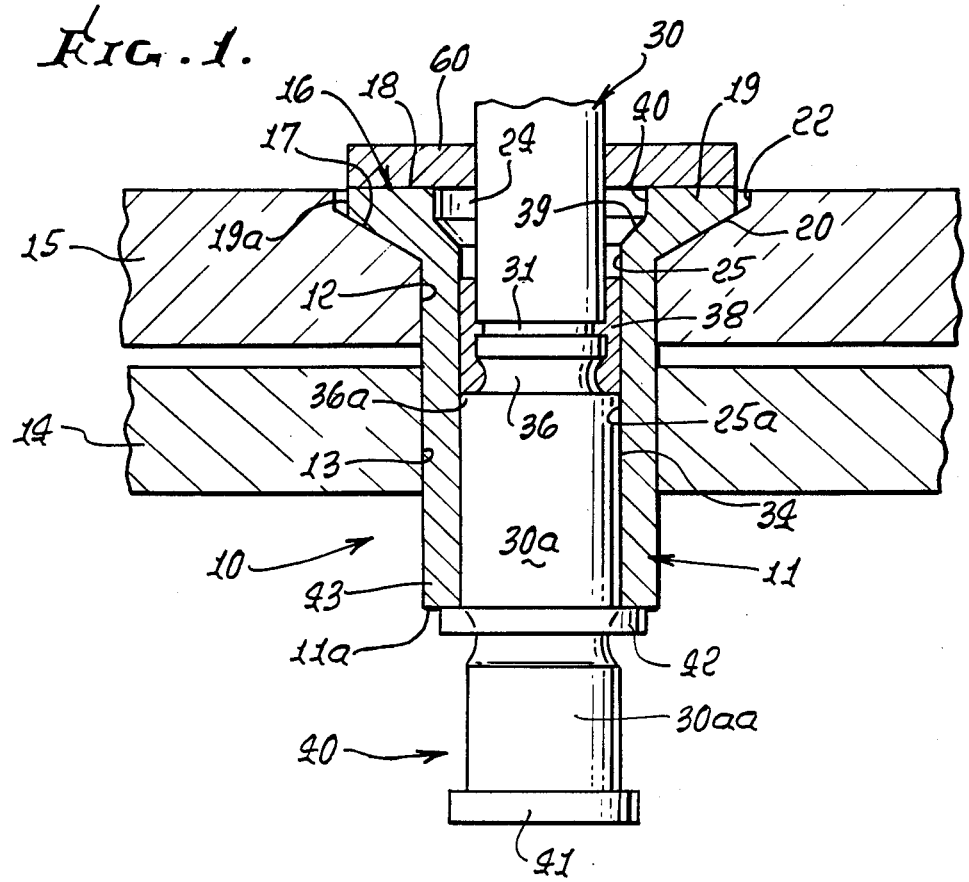
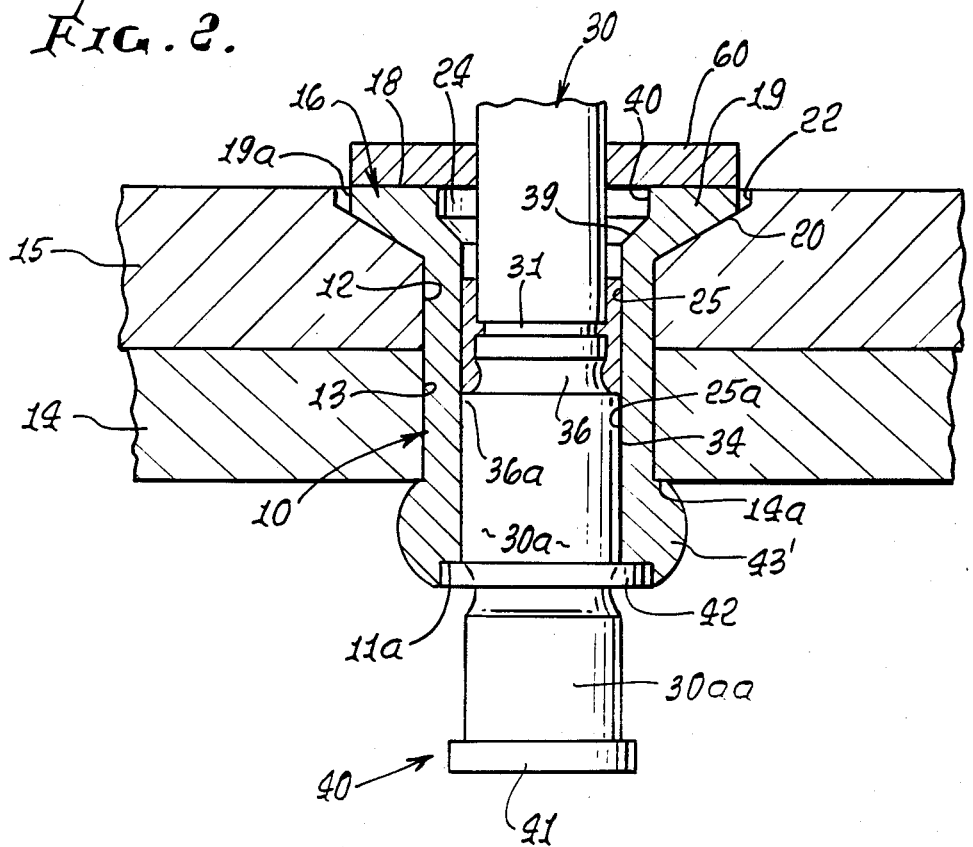

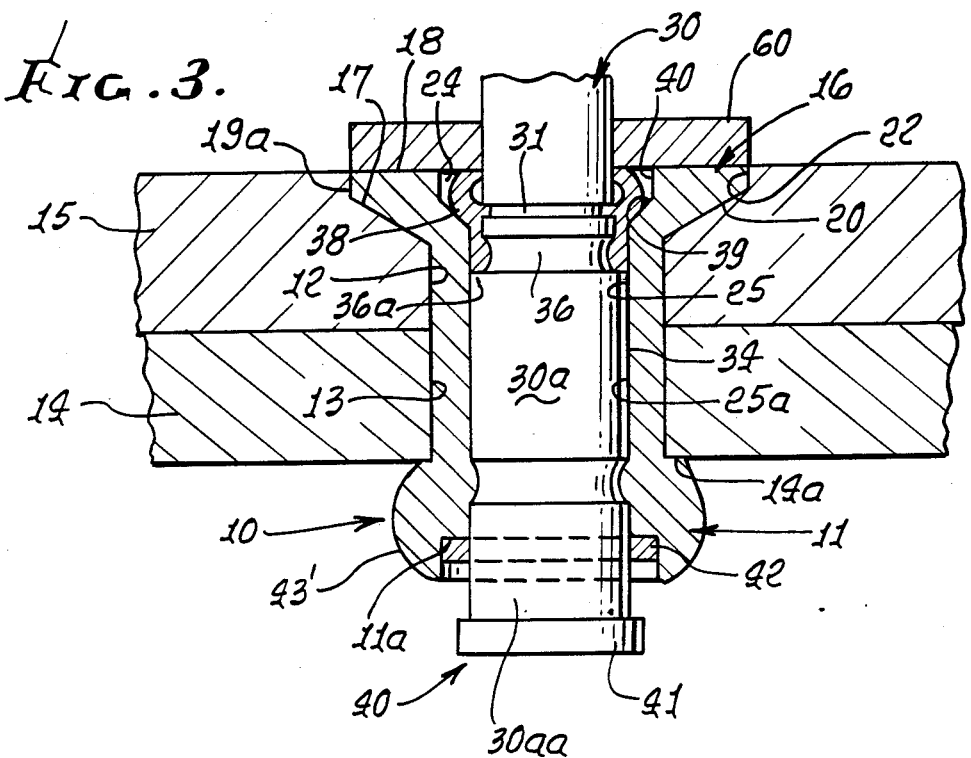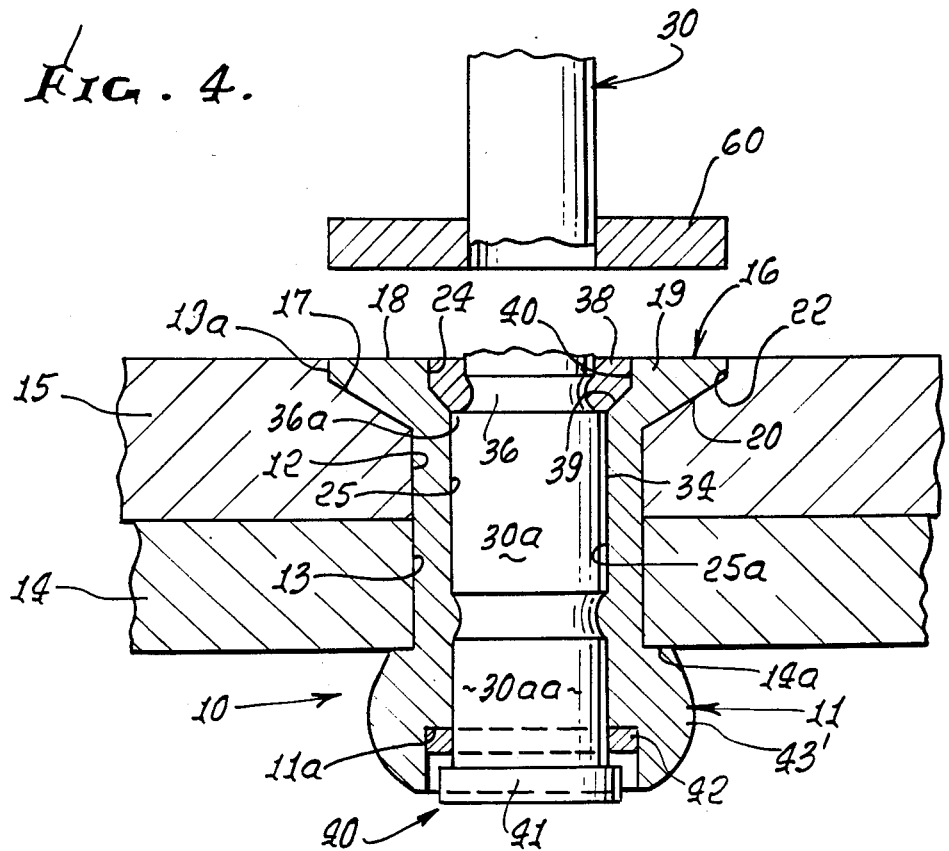

BLIND FASTENER POSITIVELY LOCKING TO WORK, AND EMPLOYING INTERIOR LOCKING RING

BACKGROUND OF THE INVENTION

This application is a continuation-in-part of Ser. No. 07/026,147, filed Mar. 16, 1987.

This invention relates generally to angle headed blind fasteners, and more particularly concerns the construction of such fasteners to overcome problems and effects stemming from fastener head and shank reception in metallic and non-metallic work bores and counterbores.

In the past, the use of angle headed fasteners to connect work panels, as for example aluminum, titanium or composite panels as employed in aircraft structure, has given rise to numerous problems. Among these were the practice of providing countersinks in the work slightly oversize in relation to the outer edges of the received fastener heads. The required removal of such material to produce the oversize countersinks resulted in undesirable notch sensitivity reduced shear bearing area, and decline of fatigue life of the structure. In this regard, most fasteners are designed to withstand shear loading, and in thin sheet applications the shear bearing area is reduced, magnifying the loading per square inch on the bearing area, thereby inducing sooner failure. Knife edge conditions associated with the countersink contribute to the problem. Also corrosion problems developed; for example, protective material filled into annular recesses about the heads tended to work loose during flexing of aircraft structures, so that corrosive fluids could gain access to the work bore along the fastener length, weakening the structure by producing corrosion and stress corrosion. Also, since the fastener head periphery does not completely engage the work bore due to the oversize relation, the development of desirable radial compression and peripheral tension in and within the elastic limits of the work material about the fastener head was not possible.

In addition, vibration induced loosening of blind fasteners connecting aircraft skins has been a very serious problem, leading to fatigue and shear failures, and corrosion problems.

SUMMARY OF THE INVENTION

It is a major object of the present invention to provide and improved blind fastener connections in or for work panels, such as aircraft skins, and which enhances stability of connected skins to resist shearing and vibration loosening, and which increases fatigue life of the connection. Basically, the invention is embodied in a tubular fastener having an axially extending tubular shank receivable in a work bore and an annular head receivable in forcible engagement with the work material forming a counterbore, and in combination with said work, the improvement comprising (a) the head having an annular end face, a first section located forwardly of said end face and having an outer annular surface to be urged in a radially outward direction to forcibly engage the work counterbore, and a second forwardly tapered section located forwardly of the first section, (b) a pin extending within the tubular shank, and a stem connected to the pin and extending endwise therefrom and from said tubular fastener, (c) means responsive to said displacement of the pin toward the head end of the fastener to expand the fastener shank at the opposite end of the fastener and axially retain the fastener in position with the head first section forcibly engaging the counterbore, (d) the head defining a first recess which is annular and sunk axially forwardly from said end face, outwardly of a cylinder defined by a bore of said tubular shank, (e) the pin defining a peripheral annular recess sunk radially inwardly and located to be brought into proximity to said first recess, and (f) an annular lock ring on the stem and contained within the tubular shank and extending into the pin recess to be retracted with the pin and to be forcibly deformed to fill both of said recesses in response to said retraction of the pin toward the head, and to exert force acting to compress the head first section against the work counterbore.

As will appear, a "two-step" connection of the head to the work counterbore may be provided, the first step comprising outward radial urging of the head toward the counterbore in response to pin displacement to compressively and radially displace the tubular shank; and the second step connection of the head to the work results from deformation of the lock ring to fill both of the two recesses, as referred to. A very tight, vibration resistant, blind fastening of the two skins or panels is thereby provided. "One-step" head connection may also be provided, as by reliance upon compression of the deformed lock ring to expand outwardly and urge the head against the work.

These and other objects and advantages of the invention, as well as the details of an illustrative embodiment, will be more fully understood from the following specification and drawings, in which:

DRAWING DESCRIPTION

FIG. 1 is a side elevation, partly in section, showing a blind fastener incorporating the invention, after insertion into a work bore formed by two panels to be interconnected;

FIG. 2 is a view like FIG. 1, but showing the fastener elements after commencement of pin retraction;

FIG. 3 is a view like FIG. 2, but showing the fastener elements after further retraction of the pin; and FIG. 4 is a view like FIG. 3, but showing the fastner elements after completed installation.

DETAILED DESCRIPTION

In FIGS. 1 and 2 the tubular fastener 10 has an axially extending tubular shank or sleeve 11 receivable in bores 12 and 13 formed by work panels or sheets 14 and 15 to be interconnected. The fastener also has an integral annular head 16 receivable in forcible engagement with work material forming a tapered countersink 17, and which is typically countersunk. A typical angularity of tapered countersink 17 is 120°. The tubular fastener may consist of aluminum or titanium or aluminum or titanium alloys, or non-metallics such as composite materials as referred to, for example. The work panels, such as aircraft skins, may consist of metallic sheets such as aluminum or titanium, or aluminum or titanium alloys. They may alternatively consist of non-metallic sheets, and illustrative of these are non-metallic (as for example graphite or boron) panels employed in aircraft structures to overcome corrosion problems and to ensure panel composite strength. Such panels may typically incorporate a myriad of graphite, boron or synthetic resin fibers or filaments extending lengthwise in the plane of a panel, representative filament diameters being between 0.0001 and 0.008 inches. Boron strands may for example be coated with silicon carbide, the result being known as "BORSIC". Organic matrices commonly used with boron or graphite filaments are modified epoxy resins, and organic resins such as polyamide and phenolics. Other examples are panels consisting of glass fiber, KEVLAR, polyester or epoxy resin. Panel resin may consist of polyamide, phenolic, epoxide and polyesters.

The head 16 has an end face 18, and a first section 19 having annular outer-surface 19a which is substantially cylindrical, and located immediately adjacent end face 18. The head also includes a forwardly tapered section 20 located immediately forwardly of the section 19 to engage work countersink 17. The outer surface 19a of section 19 is adapted to be urged in a radially outward direction, in one or two steps, as will appear, and so as to compressively engage the corresponding cylindrical counterbore 22 formed in panel or skin 15.

The head also defines a first recess 24 which is annular and sunk axially forwardly from the end face 18, outwardly of a cylinder defined by a bore 25 of the tubular shank 11.

The fastener includes a pin 30a extending within the tubular shank bore 25a (which may be an extension of bore 25). An elongated stem 30 is endwise connected with the pin, as at reduced diameter section 31, and the stem extends axially endwise from the pin and from the tubular fastener to project exteriorly thereof. The stem is typically grooved, to be pulled relatively upwardly in FIGS. 2 and 3 to drag the pin upwardly within bores 25a and 25 of the tubular shank. The pin outer surface 34 may be sized to forcibly radially engage bores 25a and 25, as it is dragged and pulled up, radially outwardly compressing the tubular shank 11 toward and against work bores 13 and 12; (clearance may be provided between 34 and 25, or 25a, but that clearance is closed as the pin is pulled upwardly) and in this process the first section 19 of head 16 is typically urged radially outwardly to reduce clearance between 19a and 22, or to engage counterbore 22. This is a "first step" outward urging of the head first section. One way to effect this is to provide an interference fit between the outer surface 34 of the pin and the bores 25a and 25 of the tubular fastener shank. For example, the nominal diameter of the pin 30a may be about 0.160 inch and the nominal diameter of bores 25a and 25 may be 0.157.

The pin has or defines a peripheral annular recess 36 sunk radially inwardly, and located to be ultimately brought into proximity to the first recess 24, as seen in FIG. 4. Note that the wall of the recess 36 is rearwardly and annularly convex at its junction with the pin outer surface 34. That juncture 36a forms a nose tending to expand the bores 25a and 25 as the pin is displaced upwardly in FIGS. 2 and 3.

An annular interiorly located lock ring 38 is provided on the stem 30 to be displaced upwardly with and on the stem as the stem is pulled upwardly. Note that in FIGS. 1 and 2 the ring is confined within the sleeve 11 and extends into pin recess 36. The ring is sized to be forced into recess 24, and deformed in that recess to extend into and fill both recesses 24 and 36, as seen in FIG. 4, for locking to the pin and against tapered surface 39 of the tubular fastener 10. In addition, the metallic ring deforms or expands radially, to urge the recess bore 40 radially outwardly, compressing the head first section 19 against the work bore 22. This constitutes a "second step" expansion of the head 16. Note that, since any clearance between the section 19 and bore 22 was taken up or significantly reduced by the "first step" expansion due to pin travel in bores 25a and 25, there is less radial displacement or compression of the section 19 required by the "second step" expansion effected by the lock ring, whereby a higher degree of compression of the section 19 can be achieved, to resist loosening of the connection of the fastener to the work panels. See FIG. 4. The described "second step" may be relied upon as the only step to effect the compression.

In this regard, an annular washer 60 is typically held compressed against end surface 18 of the fastener head 16, during deformation of the lock ring, whereby the axially displaced lock washer is confined in recess 24 and is deformed by engagement with the washer, in response to retraction of the pin and stem. Upon completion of the connection, the washer is removed, as in FIG. 4. The ring 38 may consist of aluminum, titanium, or alloys thereof, or other metals.

Means is also provided to be responsive to retraction of the pin 30a toward the head end of the fastener to expand at the opposite (i.e. bottom) of the fastener, and axially retain the fastener in position with the head first section 19 forcibly engaging counterbore 22. Such means, generally indicated at 40, may advantageously include an end flange 41 integral with the pin and a flange 42 engaging the end 11a of the tubular shank 11. Flange 42 on the pin is relatively axially displaceable toward flange 41 on a pin section 30aa between the flanges 41 and 42, as seen in FIGS. 2-4. Thus, as the pin is pulled upwardly, the flange 42 slides relatively downwardly on the pin section 30aa, and also deforms the end portion 43 of the shank 11 into an axially compressed, radially thickened annulus 43', as seen in FIGS. 2-4. The latter annulus clamps against the work panel side at 14a. Accordingly, a tight vibration resistant clamping of the panels 14 and 15 is achieved, with 43' and 20 compressing the work, and the shank compressed against the work bores, to resist shearing, and to prevent entrance of corrosive fluids.

The invention, then, contemplates the method of positively locking a tubular fastener to work bore and counterbore, the fastener having a tubular shank in the bore and an annular head in said work counterbore, the head defining a counterbore, and employing a pin received in a bore defined by said tubular shank, and a lock ring, the pin defining a peripheral recess, the lock ring initially confined within the tubular shank and extending into the pin recess to be retracted with the pin. The steps of the method then include:

(a) retracting the pin relatively axially endwise in the shank by exerting axial force and transmitting said force from the pin to a section of the shank projecting from the work bore to deform said section, thereby forming a bulb that grips the side of the work opposite said work coutnerbore, and bringing said pin recess into proximity to said head counterbore, (b) retracting the lock ring with the pin and ultimately deforming the ring to penetrate and lock into the pin head counterbore while remaining in the pin recess, and also to exert radially outward force against the head acting to radially compress the head against the work counterbore, whereby the deformed ring, the compressed head, and the pin locked to the deformed ring material together form a solid interlocked unit.

Such a method, for example, may omit the expansion of the tubular fastener shank and head by the pin as the pin is retracted; however, the latter step may also be included to provide the assured, two-step expansion or radial compression of the head in the workbore, as referred to above. The workbore may itself be tapered along length thereof facing the pin tapered surface, and pin retraction then effects controlled interengagement of the pin surface taper with the bore taper immediately prior to arrival of the pin recess at proximity to said head counterbore. The axial stem is rearwardly integrally connected to the pin at a break-away locus, and said retraction of the pin is effected by exerting pulling force on the stem and until the stem breaks away from the pin after the ring is deformed as set forth in step (b).

Also the ring 38 may be a split ring, i.e. C-shaped but with opposite ends in closely opposed relation.

The ring is typically metallic and may consist of aluminum, titanium colombium alloy, or other ductile material. The pin may consist of stainless steel, titanium, heat treatable aluminum alloy, or other suitably hard material, preferably corrosion resistant.

I claim:

1. In a tubular fastener having an axially extending tubular shank receivable in a work bore and an annular head receivable in forcible engagement with the work material forming a counterbore having a mouth, and in combination with said work the improvement comprising:
   (a) the head having an annular end face, a first section located forwardly of said end face and having an outer annular and cylindrical surface to be urged in a radially outward direction to take up initial clearance formed between said head cylindrical surface and the work counterbore and to forcibly engage the work counterbore, and a second forwardly tapered section located forwardly of the first section,
   (b) a pin extending within the tubular shank, and a stem connected to the pin and extending endwise therefrom and from said tubular fastener,
   (c) means responsive to said displacement of the pin toward the head end of the fastener to expand the fastener shank at the opposite end of the fastener and axially retain the fastener in position with the head first section forcibly engaging the counterbore,
   (d) the head defining a first recess which is annular and sunk axially forwardly from said end face, outwardly of a cylinder defined by a bore of said tubular shank,
   (e) the pin defining a peripheral annular recess sunk radially inwardly and located to be brought into proximity to said first recess,
   (f) an annular lock ring on the stem and confined within said tubular shank and extending into said pin recess to be reteracted with the pin and to be forcibly deformed to fill both of said recesses in response to said retraction of the pin toward the head, and to exert force acting to expand the head first section against the work counterbore, to provide a tightly interlocking assembly,
   (g) the head expanded to cause the periphery of said end face to engage the work counterbore at the mouth thereof, and said annular and cylindrical surface forcibly engaging said counterbore.

2. The fastener of claim 1 wherein there is initial clearance between the fastener head outer annular surface and the work counterbore.

3. The fastener of claim 1 wherein the pin engages a bore defined by the tubular shank, whereby said lock ring is pushed by the pin toward the head in response to said retraction of the pin toward the head.

4. The fastener of claim 1 including a washer extending about the stem adjacent said head, whereby the lock ring engages said washer and is confined and deformed to fill said recesses in response to retraction of the pin toward the head.

5. The method of positively locking a tubular fastener to a workbore and counterbore, the fastener having a tubular shank in the workbore and an annular head in the work counterbore, the head also defining a counterbore, the head having an annular end face, a first section located forwardly of said end face and having an outer annular cylindrical surface to be urged in a radially outward direction to forcibly engage the work counterbore, and a second forwardly tapered section located forwardly of the first section, and employing a pin received in a bore defined by said tubular shank, and a lock ring, the pin defining a peripheral recess sunk toward the pin axis, the lock ring intially confined within said tubular shank and extending into said pin recess to be retracted with the pin, the steps that include:
   (a) retracting the pin relatively axially endwise in the shank by exerting axial force and transmitting said force from the pin to a section of the shank projecting from the workbore to deform said section, thereby forming a bulb that grips the side of the work opposite said work counterbore, and bringing said pin recess into proximity to said head counterbore,
   (b) retracting the lock ring with the pin and ultimately deforming the ring to penetrate and lock into the head counterbore while remaining in the pin recess, and also to exert radially outward force against the head acting to radially expand the head against the work counterbore whereby the deformed ring, the expanded head, and the pin locked to the deformed ring material together form a solid interlocked unit,
   (c) there being initial radial clearance between the head first section outer annular and cylindrical surface and the work counterbore, and said radial expansion of the head by the lock ring being carried out to cause the expanding head to fully take up said clearance at and proximate the periphery of said end face, and to cause said outer annular and cylindrical surface to forcibly engage the work counterbore.

6. The method of claim 5 wherein an axial stem is integrally connected to the pin at a break-away locus surrounded by the lock ring, and said retraction of the pin is effected by exerting pulling force on the stem and until the stem breaks away from the pin after the ring is deformed to penetrate and lock into the head counterbore.

7. The method of claim 6 including employing a washer to extend about the stem and to receive axial force exerted by the lock ring to deflect and deform the ring to fill said head counterbore.

8. The method of claim 6 wherein the lock ring is deformed endwise to form an end surface thereof which is flush with the end of the head and with the outer surface of the work.

9. The method of claim 5 including also transmitting radial force from the pin to the shank proximate the head, during said pin retraction, to thereby displace the head radially outwardly toward the work counterbore.

* * * * *